United States Patent [19]

Melaja et al.

[11] 3,928,193

[45] Dec. 23, 1975

[54] PROCESS FOR LARGE SCALE CHROMATOGRAPHY

[75] Inventors: Asko J. Melaja; Lauri Hämäläinen; Lasse Rantanen, all of Kantvik, Finland

[73] Assignee: Suomen Sokeri Osakeyhtio (Finnish Sugar Company), Helsinki, Finland

[22] Filed: Feb. 14, 1975

[21] Appl. No.: 550,026

[52] U.S. Cl............... 210/31 C; 210/198 C; 55/386
[51] Int. Cl.²........................................ B01D 15/08
[58] Field of Search.......... 210/31 C, 198, 263, 287, 210/289, 302; 55/386, 67

[56] References Cited
UNITED STATES PATENTS

| | | | |
|---|---|---|---|
| 1,745,421 | 2/1930 | Higgins | 210/287 X |
| 3,044,904 | 7/1962 | Serbia | 127/46 |
| 3,250,058 | 5/1966 | Baddour | 55/67 |
| 3,474,908 | 10/1969 | Catravas | 210/287 X |
| 3,539,505 | 11/1970 | Lauer et al. | 210/31 |
| 3,657,864 | 4/1972 | Davis et al. | 55/386 |
| 3,695,011 | 10/1972 | Leech et al. | 55/386 |
| 3,814,253 | 6/1974 | Forsberg | 210/97 |
| 3,835,043 | 9/1974 | Geissler et al. | 210/31 C |

*Primary Examiner*—John Adee
*Attorney, Agent, or Firm*—Brumbaugh, Graves, Donohue & Raymond

[57] ABSTRACT

Process for chromatographic separation using ion-exchange resin in columns having a diameter in excess of about 1 meter and a height of 2.5 to 5 meters by establishing a stabile chromatographic column having a permeability coefficient within a desired range, introducing liquid evenly by gravity across the top of the column and achieving uniform flow of the liquid throughout the length and breadth of the column, utilizing approximately a critical velocity.

4 Claims, No Drawings

PROCESS FOR LARGE SCALE CHROMATOGRAPHY

BACKGROUND OF THE INVENTION

Chromatographic separations and fractionations of organic and inorganic substances on ion-exchange resins are extensively discussed in the literature. The processes described in most cases are analytical procedures conducted with small laboratory columns. When separation techniques are suggested for commercial uses, most of the experiments upon which the suggestions are based are carried out with columns of small dimension.

The theoretical aspects of chromatographic separations are described, for example, in a textbook recently published by John Wiley, London, 1974, written by Snyder and Kirkland, entitled "Introduction To Modern Liquid Chromatography". The theories expressed in this text are mostly based upon experiments with small scale laboratory columns.

It is generally accepted in the art that scaling up from laboratory results is difficult, particularly in chromatographic processes where theoretical models are unsatisfactory. The construction of commercial installations based upon knowledge gained from laboratory experiments in this field has turned out to be a major problem. According to those skilled in the art, the use of large columns of resins, e.g. those in excess of 1 meter in diameter, and having a height above about 2.5 meters, is not desirable because of poor separation results and because of excessive dilution of the eluted components, both of which factors make the process an uneconomical one. Where, after a liquid is introduced evenly across the top of the column, a portion of the front thereof moves downwardly at a rate different than the rate of movement of the balance of the liquid, running obliquely, "tailing" and "finger formation" occur in the bed. To avoid these problems, it is desirable that the front or leading edge of each liquid or eluent supplied to the top of the column, move downwardly at a uniform rate, the front remaining substantially in a narrow band lying in a horizontal plane.

These prior art problems are discussed, for example, by Baddour in U.S. Pat. No. 3,250,058. Good separations are achieved using thin laboratory columns, but when attempts are made to repeat the separation on a technical or commercial scale, using columns of 2 inches or more in diameter, it is found that "tailing" and "finger formation" occur in the column, both of which causes dilution and poor separation results. Baddour attempts to overcome these problems by the introduction of an arrangement of transverse baffles within the column to induce lateral flow of the liquid flowing through the column. In addition, Baddour finds it necessary to use these baffles in combination with lateral baffles.

The idea of a forced vertical flow in large scale columns was further developed by Lauer et al. in the U.S. Pat. No. 3,539,505, who introduced units for radial mixing into the column or divided the column into several short sections as described in German Patent application DOS 2,036,525. Yet another approach to the problem is described in the German Patent application DOS 2,224,794 and Japanese Patent No. 73-68752, according to which the column is saturated with the solution which is to be separated. By means of the saturated columns and countercurrent flow, the disturbances caused by density gradients in the column are avoided.

The rather complicated methods which are described above makes it possible to conduct large scale chromatographic separation procedures on a commercial basis. However, these methods lead to complicated column structures and to methods which are difficult to accomplish on a commercial scale. Where there are built-in structures within the column, substantial problems occur when the resin is back-washed or when it becomes necessary to change the ion form of the resin. Backwashing is required in these procedures after a certain number of cycles because mechanical impurities from the feed or eluent accumulate on the resin bed so that the performance of the column gradually decreases in efficiency. When the ion form of the resin is changed, the volume of the resin particles usually changes which leads to swelling or shrinking of the resin bed. It is obvious that built-in structures in the column are a nuisance in such situations. The idea of saturated resin beds and countercurrent flow also lead to complicated structures as described in the German Patent application DOS 2,224,794 or to a complicated procedure of operating the system. French Patent No. 2,190,918, published Feb. 1, 1974, discloses that columns having a diameter of 3 meters and a height of 7 meters have been used in a process for obtaining sugar from molasses by ion separation; it is not clear from the patent whether baffles are used. The process described in the French Patent, however, is concerned with ion exclusion separation processes, whereas the process and apparatus of the present invention relates to chromatographic separations.

SUMMARY OF THE INVENTION

It has now been found that chromatographic separations may be accomplished in large columns containing no built-in structures of the prior art and without using prior art saturation systems by establishing a chromatography column comprising a baffle-free cylindrical container, ion-exchange means at least partially filling the container to form a bed supported solely by the bottom and sides of the container, means for supplying solution uniformly to the top of the bed and means for collecting solution at the bottom of the bed. The ion-exchange means comprises homogeneous, isotropic, shperical ion-exchange pellets or beads having substantially equal diameters and sufficient compression strength to prevent permanent deformation under use conditions. In addition, the ion-exchange means has a permeability coefficient $k$ of from about $1 \times 10^{10}$ to about $4 \times 10^{10}$ $1/m^2$. Preferably, the ion exchange means comprises pellets of sulfonated polystyrene cation exchange resins cross-coupled with di-vinyl benzene, having a mean particle size within the range of about 0.5 mm to about 0.25 mm, with 95% of the resin particles being within ± 25% of the mean particle size of the resin. The cylindrical container is in excess of 1 meter in diameter and is somewhat higher than the desired exchange column height. A suitable means for supplying solution uniformly to the top of the bed is disclosed in U.S. Pat. No. 3,814,253.

In accordance with the process of this invention, a simple down-flow gravity feed is established of the liquid to be chromatographically separated and subsequently, of the eluent. Uniform flow is accomplished by employing evenly sized resin particles, by insuring homogeneity in the mixture of resin particles, by selecting a resin having a mean particle size which provides minimum resistance to flow, taking into account the distribution coefficients of the materials to be separated, by providing an even, turbulencefree gravity feed across the top of the column, and by providing an even, turbulence-free withdrawal of the solution by gravity from the bottom of the column. In addition, the velocity of flow of liquid in the system must be 0.5 – 2 times the critical velocity.

The large columns to which the process of the present invention is directed are those having a diameter in excess of about 1 meter and a height in excess of about 3 meters. Columns of this dimension and larger are desired in order to provide a process with sufficient capacity to make the process useful on a commercial basis.

Ion-exchange resins which are used in accordance with the process of the present invention may be any of those normally used in the art for chromatographically separating organic and inorganic substances in ion-exchange resin beds. Suitable resins include the alkali metal and the alkaline earth metal salts of a polystyrene sulfonate cation exchange resin cross-coupled with di-vinyl benzene. These resins are generally provided by the manufacturer in certain grades and particle sizes. It has been found that where there is a large variation in particle size of the resin particles in the bed, it becomes difficult to obtain proper uniform flow of the liquid. Accordingly, it is necessary according to this invention to further classify most resins to obtain resins having particle sizes as nearly even as is practically possible. It has been found that best results including good separation of components are obtained if 95% of the resin is within ± 25% of the mean particle size. The preferred range of mean resin particle size is within the range of about 0.5 mm to about 0.25 mm.

Another factor which has been found to be important in achieving uniform flow is the homogeneity of the resin particles in the bed. As is well recognized in the art, there is a tendency in columns of particulate material for particles of varying size to classify, e.g. to concentrate themselves in different strata of the column. It is important according to this invention that stratafication within the column be minimized and that the particles of resin be distributed homogeneously according to particle size across the column and throughout its length. This result is termed uniform packing. One way of accomplishing this in accordance with the present invention is to thoroughly and vigorously back-wash the resin bed.

Still another factor to be considered is the mechanical strength of the resin being used. This is important because when certain resins of a weak nature are used in long columns, the weight of the column contents causes deformation of the particles in the bed which in turn causes disturbances in the flow. When polystyrene resins are used, the strength of the resin depends upon the di-vinyl benzene content of the resin. Good chromatographic separations of sugars have been achieved with resins containing 2–6% di-vinyl benzene with a resin bed depth of about 3.5 meters.

Another important factor in the establishment of uniform flow is the selection of the appropriate mean resin particle size. Optimal performance of the column is achieved when flow rate and temperature as well as dry substance content of the feed are chosen so that viscosity and density-gradients in the column do not cause tailing or fingers, but tend to stabilize the conditions at the frontiers between the fractions. This has been found to vary in accordance with the distribution coefficient of the components in the liquid which are to be separated. The mean particle size is chosen in accordance with the distribution coefficient of the components which are to be separated, so that the resistance to flow in the column is as small as possible and so that diffusion into and out of the resin particles does not become the rate controlling step in the separation process. If the coefficients are large, a coarse resin may be used. In addition to the factors discussed above which concern uniform flow of the viscous fluid, it is important that optimum column permeability be used and that the solution flow through the column at approximately the critical velocity of the system.

In a chromatographic separation, the resolution between the components which are to be separated, depends upon the linear velocity of the flow through the column and generally decreaes with increasing velocity. The permeability of the system increases with increasing particle size of the resin. It is desirable to achieve a permeability as high as possible in order to achieve a commercially feasible production rate. On the other hand, the velocity of the flow must be low enough to ensure a reasonable resolution or separation of the components in the solution. The resolution sets an upper limit to the permeability and the velocity of the flow through the system. The permeability of the columns used in the present invention can be defined from the permeability coefficient and must be found empirically for each system. The permeability coefficient can be defined by the following equation:

$$(1) \quad k = \frac{\Delta p}{\mu v L}$$

where
$\Delta p$ = pressure drop in the resin bed (N/m$^2$)
$v$ = linear velocity of the flow of the solution (m/s)
$L$ = height of the resin bed (m)
$\mu$ = viscosity of the solution (Ns/m$^2$)
$k$ = permeability coefficient (1/m$^2$)

The formula (1) is a modification of the so called Darcy's law for flow in a porous medium where the Reynolds number is below 1.

It has been found that the fingering and tailing which occurs even in quite uniformly packed beds and which is caused by density- and viscosity- differences in the solution is avoided or minimized if the velocity of the flow is the critical velocity ($v_c$) or 0.5 – 2.0 times the critical velocity which depends on the system parameters.

The critical velocity must be found empirically for the chromatograph system, and depends on viscosity- and density-differences in the solution. S. Hill discusses the critical velocity for packed columns in *Chem. Eng. Sci.* Vol. 1, page 247 (1952).

The critical velocity can be expressed by the following formula:

$$(2) \quad v_c = \frac{g(S_2 - S_1)}{k(\mu_2 - \mu_1)}$$

where
$v_c$ = critical velocity (m/s)
$S$ = specific gravity (kg/m$^3$)
$\mu$ = viscosity (Ns/m$^2$)

$k$ = permeability coefficient of the bed ($1/m^2$)
$g$ = gravity constant 9.81 $m/s^2$ Considering a fluid viscosity $\mu_2$ and density $S_2$ displacing a fluid of viscosity $\mu_1$ and density $S_1$ by downward flow, the indexes 1 and 2 in (2) refer to the upper and lower fluid layer respectively.

In the concentration ranges which are used in large scale separations of sugars and polyols, the density and viscosity are approximately linearly correlated to the concentration. Thus, one obtains the following equations:

(3) $S = S_o + \alpha c$
(4) $\mu = \mu_o = \beta c$

Where $\alpha$ and $\beta$ are empirical constants and $c$ is the concentration of the solution in weight %, $S_o$ is the density of water and $\mu_o$ is the viscosity of water.

Substituting equations 3 and 4 in equation 2, we get for the critical velocity:

(5) $v_c = \dfrac{g\,\alpha}{k\,\beta}$

We have found that for separations by large scale chromatography of sugars and polyols in columns with a diameter over 1 m and a height over 3 m which are filled with a polystyrenedivinylbenzene resin with a particle size of 0.25 – 0.50 mm in alkaline earth form, the permeability coefficient $k$ is within the range of:

$1 \times 10^{10}$ $1/m^2$ to $4 \times 10^{10}$ $1/m^2$

The permeability coefficient depends on the system parameters of cross section and height of the resin bed, particle size of the resin, size distribution of the resin, and type of resin.

Additionally, it has been found that when monosaccharides or polyols are separated at 50°C, the constants $\alpha$ and $\beta$ are:
$\alpha = 4$ ($kg/m^3$)
$\beta = 1.3 \times 10^{-5}$ ($Ns/m^2$)

Thus, the critical velocity for the separations described in Examples 2 and 3 below can be calculated as:
$V_{c2} = 0.5$ m/h
$V_{c3} = 0.3$ m/h The pressure drop in the column, $\Delta P/L$, was 2000 $N/m^2$ per meter of resin depth in the bed.

The critical velocity and permeability coefficient described above relate to stabilized chromatographic systems. After a back-wash operation, the column must be allowed to stabilize. The is accomplished by feeding water to the column until the bed has reached stabile condition.

The feed intervals are chosen as small as possible, but so that fractionated components do not overlap from one feed to the next. The dry substance content of the feed is chosen so that optimal conditions are achieved considering separation capacity and quality as well as evaporation and construction costs.

The method of the present invention makes it possible to conduct large chromatographic separations with separation efficiency which is as good as is obtained with small laboratory columns. This is accomplished using simple and relatively inexpensive structures which are easier to fill with resin, which are easier to back-wash, and which offer small resistance to flow. In addition, no significant problems are encountered with swelling or shrinking of the resin during the separation cycle or during regeneration. As compared with a battery of small columns to provide the same capacity, the apparatus used in the practice of the present invention is less expensive to construct and maintain, requires a reduced amount of auxiliary equipment such as pipelines, valves, and pumps, and has a significantly reduced instrumentation cost.

The process of the present invention is carried out as a simple gravity feed down-flow chromatography where feed solution and eluent are fed successively to the top of the column. The following working examples further illustrate the performance of a large scale column. In each example only one separation cycle is described. It is recognized, however, that in practical operation the eluent used in the separation step is followed by the next passage of feed solution, which in turn is again followed by eluent. In example 1, the separation step lasts 120 minutes whereafter the next feed is added to the top of the column. In examples 2 and 3, each separation step is 160 minutes.

It is further noted that each of the following examples was conducted in a column which was provided with a liquid-control apparatus as shown and claimed in U.S. Pat. No. 3,814,253, the disclosure of which is incorporated herein by reference. The column of resin was supported on a fine mesh screen at the bottom of the column which in turn is supported by an evenly perforated plate. Beneath the plate is an unobstructed area for collecting the solution that has passed through the column. Additional means are provided at the bottom of the column for turbulence-free withdrawal of the solution by gravity.

EXAMPLE 1

Organic (sugars) and inorganic (non-sugars) components were separated from a birch wood hydrolyzate by chromatographic procedures using the following equipment and conditions:

| | |
|---|---|
| Column: | diameter 260 cm, resin bed 350 cm high. |
| Resin: | sulphonated polystyrene strong cation exchanger with 3.5% divinylbenzene; mean resin particle size 0.43 mm; Na⁺-form; of the resin particles, 95% were within ± 25% of the mean particle size. |
| Linear Feed Rate: | 1 meter/hour |
| Temperature: | +50°C |
| Feed: | 540 kg dry substance as a 18% water solution; the feed contained 59% sugars of the dry weight. |

The column was filled with the resin to a height of 350 cm. and the resin was thoroughly back-washed to insure homogeneity of resin particle size throughout the column. The mean resin particle size of 0.43 mm. was selected after evaluation of a range of resin particle sizes. The selected resin particle size provided a minimum resistance to flow to the birch wood hydrolyzate feed solution.

Both feed solution and eluent (water) were supplied to the top of the column using the liquid control apparatus disclosed in U.S. Pat. No. 3,814,253, by spraying a fine spray over a liquid-pervious plate assembly overlying the resin bed. Uniform flow was established throughout the column and was maintained during the complete process. The fractions were withdrawn from the bottom of the column without disturbing the uniform flow.

The column was eluted with water and the components separated as follows:

| Fraction (10 Minutes) | Total Solids g/100 ml | Non-Sugars g/100 ml | Sugars g/100 ml |
|---|---|---|---|
| 1 | 0.3 | 0.3 | — |
| 2 | 0.7 | 0.7 | — |

-continued

| Fraction (10 Minutes) | Total Solids g/100 ml | Non-Sugars g/100 ml | Sugars g/100 ml |
|---|---|---|---|
| 3 | 1.1 | 1.1 | — |
| 4 | 2.3 | 2.3 | — |
| 5 | 3.2 | 3.2 | — |
| 6 | 4.2 | 4.2 | — |
| 7 | 5.2 | 5.2 | — |
| 8 | 4.3 | 2.9 | 1.4 |
| 9 | 8.0 | 0.1 | 7.9 |
| 10 | 13.3 | — | 13.3 |
| 11 | 6.8 | — | 6.8 |
| 12 | 0.7 | — | 0.7 |

Comparison of the separation process above with a similar separation on a laboratory column which is described in West German published patent application DOS 2,224,794, shows that the performance of the large column of the process of this example is as good or better than the performance of the small column of the prior art.

EXAMPLE 2

Glucose and fructose were separated from an aqueous solution containing both by chromatographic procedures using the following equipment and conditions:

| | |
|---|---|
| Column: | diameter 260 cm, resin bed 350 cm high. |
| Resin: | sulphonated polystyrene strong cation exchanger with 3.5% divinylbenzene mean particle size 0.38 mm; $Ca^{++}$ -form; of the resin particles, 95% were within ± 25% of the mean particle size. |
| Linear Feed Rate: | 0.42 meters/hour |
| Temperature: | + 55°C |
| Feed: | 750 kg dry substance as a 37.5% water solution. The feed contained 60.5% fructose and 39.5% glucose of the dry weight. |
| Permeability Coefficient: | $k = 2.2 \times 10^{10}$ $1/m^2$ |
| Critical Velocity: | $v_c = 0.5$ m/h |

The column was filled with the resin to a height of 350 cm. and the resin was thoroughly back-washed to insure homogeneity of resin particle size throughout the column. The mean resin particle size of 0.38 mm. was selected after evaluation of a range of mean particle sizes. The selected resin particle size provided a minimum resistance to flow to the feed solution.

Both feed solution and eluent (water) were supplied to the top of the column using the liquid control apparatus disclosed in U.S. Pat. No. 3,814,253, by spraying as a fine spray over a liquid-pervious plate assembly overlying the resin bed. Uniform flow was established throughout the column and was maintained during the complete process. The fractions were withdrawn from the bottom of the column without disturbing the uniform flow.

The column was eluted with water and the sugars separated as follows:

| Fraction (10 Minutes) | Dry Substance g/100 ml | Fructose g/100 ml | Glucose g/100 ml |
|---|---|---|---|
| 1 | 0.5 | — | 0.5 |

-continued

| Fraction (10 Minutes) | Dry Substance g/100 ml | Fructose g/100 ml | Glucose g/100 ml |
|---|---|---|---|
| 2 | 2.7 | — | 2.7 |
| 3 | 7.2 | — | 7.2 |
| 4 | 11.5 | — | 11.5 |
| 5 | 13.4 | — | 13.4 |
| 6 | 13.7 | 0.1 | 13.6 |
| 7 | 11.0 | 0.3 | 10.7 |
| 8 | 7.5 | 3.0 | 4.5 |
| 9 | 10.8 | 8.7 | 2.1 |
| 10 | 15.6 | 14.7 | 0.9 |
| 11 | 18.6 | 18.3 | 0.3 |
| 12 | 19.3 | 19.3 | — |
| 13 | 18.0 | 18.0 | — |
| 14 | 12.9 | 12.9 | — |
| 15 | 7.0 | 7.0 | — |
| 16 | 2.5 | 2.5 | — |

As compared to a laboratory experiment using a column 3.75 inches in diameter which is described in U.S. Pat. No. 3,044,904, the recoveries are as good or better, and the scale much larger.

EXAMPLE 3

Individual polyols were separated from an aqueous solution containing a mixture of polyols, using the equipment described in Examples 1 and 2. The conditions employed were as follows:

| | |
|---|---|
| Column: | as in Examples 1 and 2 |
| Permeability Coefficient: | $k = 2.6 \times 10^{10}$ $1/m^2$ |
| Critical Velocity: | $v_c = 0.3$ m/h |
| Resin: | sulphonated polystyrene cation exchanger with 3.5% divinylbenzene; mean particle size 0.27 mm; $Sr^{++}$ -form; of the resin particles, 95% were within ± 25% of the mean particle size. |
| Linear Feed Rate: | 0.50 meters/hour |
| Temperature: | + 55°C |
| Feed: | 420 kg dry substance as a 28% water solution. Composition: arabinitol 4.5%, xylitol 77.9%, mannitol 3.7%, galactitol 3.6%, sorbitol 8.1%, others 2.2%. |

The column was filled with the resin to a height of 350 cm. and the resin was thoroughly back-washed to insure homogeneity of resin particle size throughout the column. The mean resin particle size of 0.27 mm was selected after evaluation of a range of mean particle sizes. It was determined that resin of the selected particle size provided minimum resistance to flow of the feed solution.

Both feed solution and eluent (water) were supplied to the top of the column using the liquid control apparatus disclosed in U.S. Pat. No. 3,814,253, by spraying as a fine spray over a liquid-pervious plate assembly overlying the resin bed. Uniform flow was established throughout the column and was maintained during the complete process. The fractions were withdrawn from the bottom of the column without disturbing the uniform flow.

The column was eluted with water and the components separated as follows:

| Fraction (10 Minutes) | Dry Substance g/100 ml | Mannitol g/100 | Arabinitol g/100 | Galactitol g/100 | Others g/100 | Xylitol g/100 | Sorbitol g/100 ml |
|---|---|---|---|---|---|---|---|
| 1 | 0.6 | 0.25 | 0.25 | — | 0.1 | — | — |
| 2 | 1.65 | 1.00 | 0.55 | — | 0.1 | — | — |
| 3 | 2.4 | 1.4 | 0.8 | — | 0.2 | — | — |
| 4 | 3.1 | 1.3 | 1.15 | 0.15 | 0.4 | 0.1 | — |
| 5 | 3.65 | 0.7 | 0.9 | 0.75 | 0.45 | 0.8 | 0.05 |
| 6 | 5.05 | 0.3 | 0.5 | 1.1 | 0.35 | 2.6 | 0.2 |

| Fraction (10 Minutes) | Dry Substance g/100 ml | Mannitol g/100 | Arabinitol g/100 | Galactitol g/100 | Others g/100 | Xylitol g/100 | Sorbitol g/100 ml |
| --- | --- | --- | --- | --- | --- | --- | --- |
| 7 | 7.3 | 0.1 | 0.2 | 0.9 | 0.2 | 5.4 | 0.5 |
| 8 | 9.4 | — | 0.1 | 0.55 | 0.05 | 8.0 | 0.7 |
| 9 | 12.25 | — | — | 0.3 | — | 11.0 | 0.95 |
| 10 | 12.4 | — | — | 0.15 | — | 11.3 | 0.95 |
| 11 | 9.3 | — | — | — | — | 8.5 | 0.8 |
| 12 | 6.9 | — | — | — | — | 6.3 | 0.6 |
| 13 | 4.85 | — | — | — | — | 4.4 | 0.45 |
| 14 | 2.95 | — | — | — | — | 2.6 | 0.35 |
| 15 | 1.95 | — | — | — | — | 1.7 | 0.25 |
| 16 | 0.65 | — | — | — | — | 0.5 | 0.15 |

These results obtained with a large column are as good, or better than results obtained with small sized laboratory columns having a diameter of 22.5 cm.

We claim:

1. A method for accomplishing chromatographic separation using ion-exchange resin in cylindrical, baffle-free chromatographic columns having a diameter in excess of about 1 meter and a height of from about 2.5 to about 5 meters which comprises the steps of
   1. packing the column with a particulate ion-exchange resin to provide a bed having a permeability coefficient $k$ of from about $1 \times 10^{10}$ to about $4 \times 10^{10}$ $1/m^2$,
   2. saturating the column with water and back-washing to provide uniform packing of resin,
   3. introducing the liquid to be chromatographically separated evenly across the column while initiating uniform flow of said liquid down through the column at a velocity of flow equal to 0.5 – 2 times the critical velocity of the system, and
   4. eluting with water to recover successive fractions from the bottom of the column.

2. The method of claim 1, wherein the column is of the $Ca^{++}$ form of sulfonated polystyrene strong cation exchange resin cross-coupled with 3.5% di-vinyl benzene, with a mean resin particle size of 0.38 mm, with 95% of the resin particles being within ± 25% of the mean particle size and provides a bed having a permeability coefficient $k$ of $2.2 \times 10^{10}$ $1/m^2$, and an invert sugar solution is fed through the column at a velocity of 0.25 – 1.0 m/h to chromatographically separate glucose and fructose therefrom.

3. The method of claim 1, wherein the column is of sulfonated polystyrene cation exchange resin cross-coupled with 3.5% di-vinyl benzene in the $Sr^{++}$ form having a mean particle size of 0.27 mm with 95% of the particles being within ± 25% of the mean particle size and provides a bed having a permeability coefficient $k$ of $2.6 \times 10^{10}$ $1/m^2$, and an aqueous solution of polyols is fed through the column at a velocity of 0.15 – .60 m/h to separate polyols therefrom.

4. The method of claim 1, wherein the ion-exchange resin particles are sulfonated polystyrene cation exchange resins cross-coupled with di-vinyl benezene, having a mean particle size within the range of about 0.5 mm to about 0.25 mm, 95% of the resin particles being within + 25% of the mean particle size of the resin.

* * * * *